United States Patent
Takahashi et al.

[11] Patent Number: 5,403,368
[45] Date of Patent: Apr. 4, 1995

[54] METAL OXIDE FILM HAVING MINUTELY ROUGHED SURFACE AND METHOD OF FORMING SAME ON GLASS SUBSTRATE

[75] Inventors: Osamu Takahashi; Hiroaki Arai; Seiji Yamasaki, all of Mie, Japan

[73] Assignee: Central Glass Company, Limited, Yamaguchi, Japan

[21] Appl. No.: 983,023

[22] Filed: Nov. 30, 1992

[30] Foreign Application Priority Data

Nov. 29, 1991 [JP] Japan ................................. 3-316992

[51] Int. Cl.$^6$ ........................ C03B 8/00; C03C 17/00; C03C 17/28; B32B 17/06
[52] U.S. Cl. ..................................... 65/17.2; 65/60.1; 65/60.3; 65/60.5; 65/60.52; 501/12; 501/14; 501/18; 427/165; 427/287; 428/410; 428/432
[58] Field of Search ....................... 65/60.1, 60.2, 60.3, 65/60.4, 60.5, 60.51, 60.52, 60.53, 60.7, 60.8, 17.2; 427/165, 126.2, 226, 269, 287, 280, 383.5, 383.1, 126.3; 501/12, 154, 14, 18; 428/410, 432, 141, 142, 156, 543

[56] References Cited

U.S. PATENT DOCUMENTS

| | | | |
|---|---|---|---|
| 3,660,061 | 5/1972 | Donley et al. | |
| 3,850,665 | 11/1974 | Plumat et al. | 427/226 |
| 4,100,330 | 7/1978 | Donley | 65/60.53 |
| 4,129,434 | 12/1978 | Plumat et al. | 65/60.52 |
| 4,160,061 | 7/1979 | Okino et al. | 427/226 |
| 4,329,379 | 5/1982 | Terneu et al. | 65/60.5 |
| 4,596,745 | 6/1986 | Chao | 428/432 |
| 4,719,126 | 1/1988 | Henery | 65/60.52 |
| 4,719,127 | 1/1988 | Greenberg | 65/60.52 |
| 4,830,879 | 5/1989 | Debsikdar | 427/162 |
| 5,112,676 | 5/1992 | Cot et al. | 427/126.2 |
| 5,137,560 | 8/1992 | Ohmura et al. | 427/126.2 |
| 5,137,749 | 8/1992 | Yamazaki et al. | 427/126.2 |
| 5,219,611 | 6/1993 | Giannelis et al. | 427/126.2 |
| 5,250,322 | 10/1993 | Takahashi et al. | 501/12 |
| 5,275,843 | 1/1994 | Hirano | 501/12 |

FOREIGN PATENT DOCUMENTS

| | | | |
|---|---|---|---|
| 751917 | 8/1970 | France | 65/60.52 |
| 54-24 | 1/1979 | Japan | 65/60.52 |
| 54-22426 | 2/1979 | Japan | 65/60.52 |
| 1-239024 | 9/1989 | Japan . | |

OTHER PUBLICATIONS

Atta et al, "Development of Multilayer AR Coatings Derived from Alkoxide-Based Polymeric Sols" from Frontiers of Polymer Research edited by Prasad et al, 1991 pp. 195–199.

Patent Abstracts of Japan, vol. 14, No. 208, 27 Apr. 1990: Method for Synthesizing Precursor of Silica Glass.

Patent Abstracts of Japan, vol. 11, No. 315, 14 Oct. 1987: Production of Glass.

Chemical Abstracts, vol. 114, No. 20, 20 May 1991: Preparation of Sols.

*Primary Examiner*—W. Gary Jones
*Assistant Examiner*—Steven P. Griffin
*Attorney, Agent, or Firm*—Keck, Mahin & Cate

[57] ABSTRACT

The invention relates to a metal oxide film formed on a glass substrate by a sol-gel process. To make the metal oxide film minutely rough, at least two sols are respectively prepared from at least one compound selected from the group consisting of metal alkoxides and metal acetylacetonates, such that polymers of the sols have different average molecular weights. Then, the at least two sols are mixed with a solvent so as to prepare a coating solution. The coating solution is applied to the glass substrate so as to form thereon a sol film. The thus coated glass substrate is heated so as to transform the sol film into a gel film and to form thereon numerous micro-pits.

14 Claims, 2 Drawing Sheets

METAL OXIDE FILM HAVING MINUTELY ROUGHED SURFACE AND METHOD OF FORMING SAME ON GLASS SUBSTRATE

BACKGROUND OF THE INVENTION

1. Field of the Invention

The present invention relates to a metal oxide film having a minutely roughed surface, which is useful as a base or interlayer film of multilayered films on a glass substrate, and a method of forming the same.

2. Description of the Prior Art

Often it is desired to form a metal oxide film having a minutely roughed surface as a base or interlayer film of multilayered films on a glass substrate. This metal oxide film has numerous micro-pits which are scattered on its surface, thereby making the film minutely roughed. With the provision of this metal oxide film, adhesion of the multilayered films to the glass substrate is substantially enhanced, thereby improving abrasion resistance and durability of the multilayered films.

There are conventional methods of minutely roughening or forming numerous micro-pits on a metal oxide film. One example of the methods is etching a metal oxide film surface with hydrofluoric acid, fluorine nitrate or the like. However, this method has the following drawbacks.

Hydrofluoric acid and fluorine nitrate are very hazardous against human body. Therefore, these compounds must be handled very cautiously. This lowers the production efficiency. Furthermore, it is difficult to precisely control the thickness of a metal oxide film and the size of micro-pits.

Another example of the above conventional methods is producing numerous micro-pits on a metal oxide film by the thermal decomposition of an organic polymer added to a metal alkoxide solution. However, this method has the following drawback.

Micro-pits on the metal oxide surface tend to disappear by the densification of the film after baking at a temperature not lower than 400° C.

SUMMARY OF THE INVENTION

It is therefore an object of the present invention to provide a metal oxide film having a minutely roughed surface which is scattered with numerous and durable micro-pits.

It is another object of the present invention to provide an improved method of forming the metal oxide film on a glass substrate, which is free of the above-mentioned drawback.

According to a first aspect of the present invention, there is provided a method of forming on a glass substrate a metal oxide film having numerous micro-pits thereon, the method including the sequential steps of:

(a) preparing at least two sols respectively from at least one compound so as to disperse therein at least two polymers of the at least one compound, the at least one compound being selected from the group consisting of metal alkoxides and metal acetylacetonates, the at least two polymers having different average molecular weights;

(b) mixing the at least two sols with a solvent so as to prepare a coating solution;

(c) applying the coating solution to the glass substrate so as to form thereon a sol film; and (d) heating the glass substrate so as to transform the sol film into a gel film and to form thereon numerous micro-pits.

According to a second aspect of the present invention, there is provided a metal oxide film which is prepared in accordance with the above method.

DESCRIPTION OF THE PREFERRED EMBODIMENTS

Figure 1:
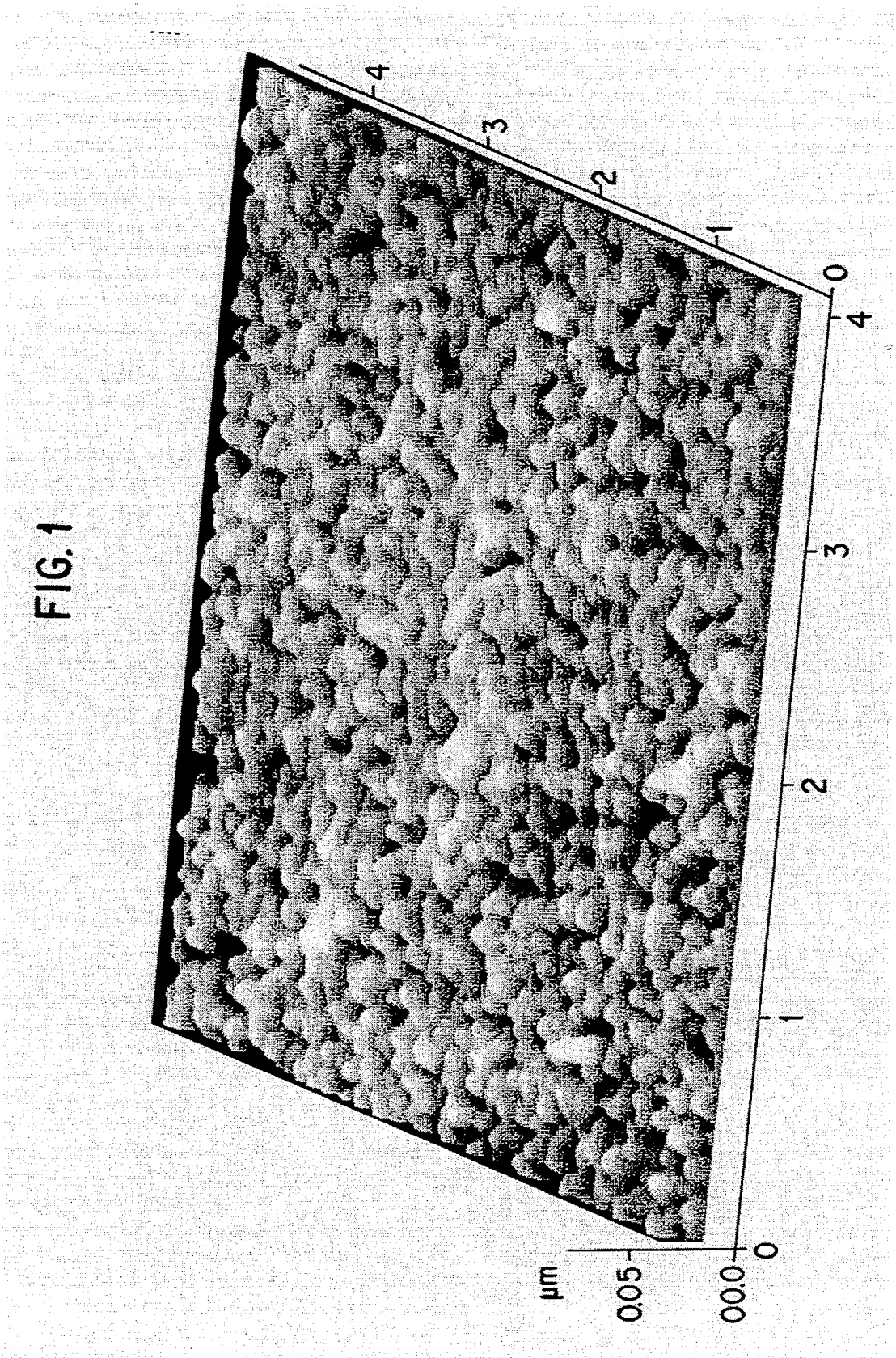
FIG. 1 is a photograph taken through an atomic force microscope, showing a surface condition of a metal oxide film coated on a glass plate in accordance with the present invention.

According to the present invention, there is provided a method of forming a metal oxide film on a glass substrate. This method includes the sequential steps of:

(a) preparing at least two sols respectively from at least one compound so as to disperse therein at least two polymers of the at least one compound, the at least one compound being selected from the group consisting of metal alkoxides and metal acetylacetonates, the at least two polymers having different average molecular weights;

(b) mixing the at least two sols with a solvent so as to prepare a coating solution;

(c) applying the coating solution to the glass substrate so as to form thereon a sol film; and (d) heating the glass substrate so as to transform the sol film into a gel film and to form thereon numerous micro-pits.

A metal alkoxide sol and/or a metal acetylacetonate sol is used in the present invention because of the following reasons.

The average molecular weight of polymer of each sol can be relatively easily controlled. Furthermore, a metal oxide film made from a metal alkoxide sol and/or a metal acetylacetonate sol is high in transparency, hardness and durability. Still furthermore, a metal alkoxide and a metal acetylacetonate are relatively cheap in price and easily available.

A metal alkoxide of the present invention may be either a simple alkoxide having no organic group other than alkoxyl group, such as a methoxide, an ethoxide, an isopropoxide or the like, or an alkyl alkoxide having at least one alkyl group besides alkoxyl group, such as a monomethylalkoxide or a monoethylalkoxide.

A metal acetylacetonate of the present invention may be either a simple acetylacetonate having no organic group other than acetylacetone group, or an acetylalkoxyacetonato such as methylalkoxyacetonato or ethylalkoxyacetonato.

It is preferable to use Si, Ti and/or Zr as a metal of the metal alkoxide or of the metal acetylacetonate. Thus, examples of the metal alkoxides and the metal acetylacetonate are tetramethoxysilane, tetraethoxysilane, methyltrimethoxysilane, titanium tetraisopropoxide, titanium acetylacetonate, zirconium n-butoxide, zirconium acetylacetonate, dimethyldiethoxysilane, dimethyldimethoxysilane, titanium tetra-n-butoxide, zirconium tetraisopropoxide and zirconium tetraoctyrate.

In the present invention, at least two sols are used for the purpose of making the metal oxide film minutely rough. At least two polymers which are respectively dispersed in the at least two sols have different average molecular weights.

In the present invention, at least one compound selected from the group consisting of metal alkoxides and metal acetylacetonates is used for preparing the at least two sols.

In the present invention, it is preferable to use one sol containing the polymer having an average molecular weight ranging from about 800 to about 8000 and more preferably from about 2000 to about 7000, and the other at least one sol containing the polymer having an average molecular weight not lower than 10,000 and more preferably from 10,000 to about 70,000 or from about 100,000 to about 400,000.

The average molecular weights of the polymers can be relatively easily controlled by adjusting hydrolysis reaction or polycondensation reaction of a metal alkoxide and/or a metal acetylacetonate. In fact, this adjustment can be conducted by selecting a suitable catalyst, for example, from hydrochloric acid, nitric acid and acetic acid, and controlling the amount of the catalyst, pH value, the reaction temperature, etc. It is preferable to use a pH value of a metal alkoxide or metal acetylacetonate sol, ranging from about 1 to about 6, more preferably from about 2 to about 4. The reaction temperature of hydrolysis and polycondensation preferably ranges from about 20° C. to about 80° C., and more preferably from 25° C. to about 70° C. It may be difficult to set fixed conditions with respect to the type of catalyst, pH value, the reaction temperature, etc. for different combinations of sols.

It is preferable to mix the above-mentioned one sol with the other at least one sol in the ratio of 1:1 to 8:1, more preferably from 3:1 to 6:1, by the number of moles of solute calculated as metal oxide basis.

It is preferable to have a coating solution having a concentration of a metal alkoxide and/or a metal acetylacetonate in an alcohol solution in the range from 0.1 to 10 wt %. If the concentration is less than 0.1 wt %, it is difficult to form uniformly scattered micro-pits on the surface of the metal oxide film. If the concentration is higher than 10 wt %, the solution becomes too viscous. This tends to form cracks on the surface of the metal oxide film. As the alcohol solution, it is usual to use methyl alcohol, isopropyl alcohol or 1-butanol.

It is preferable to adjust viscosity of the coating solution in the range from 1 to 10 cP.

As the coating method, it is usual to use dip coating, spraying, flow coating or spin coating.

It is preferable to dry each coated film at a temperature no lower than 100° C. for about 30 min so as to transform the coated film into a gel film having numerous scattered micro-pits thereon.

It should be noted that the scattered micro-pits according to the present invention will not disappear even if the metal oxide film is baked at a temperature not lower than 500° C.

A glass substrate according to the present invention may be colorless or colored as long as it is transparent. The glass substrate may be flat or curved in shape, or a tempered one.

The advantages of the present invention will be described in the following.

Even if a glass substrate coated with a metal oxide film in accordance with the present invention is baked at a high temperature, for example, not lower than 500° C., numerous micro-pits are stable and will not disappear. Therefore, adhesion of the metal oxide film to the glass substrate is substantially enhanced. Furthermore, adhesion between the metal oxide films of a laminated films is also enhanced. It should be noted that the metal oxide film is high in transparency and hardness.

The following examples are illustrative of the present invention, but these examples are not limitative.

EXAMPLE 1

In this example, three-layered metal oxide films were formed on a glass substrate in accordance with the following steps.

Figure 2:
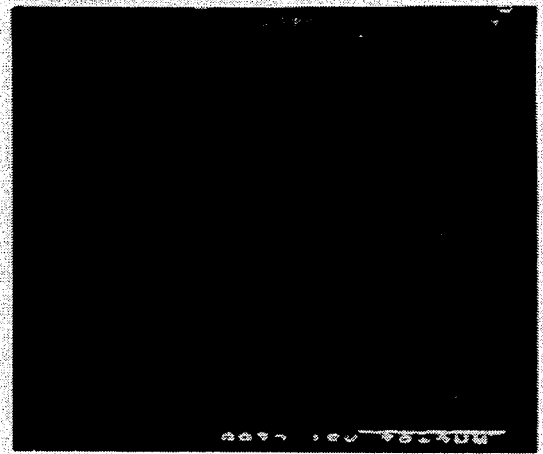
FIG. 2 is a photograph taken through a scanning electron microscope of 10,000 magnifications, showing a surface condition of a metal oxide film coated on a glass plate in accordance with the present invention.
Figure 3:
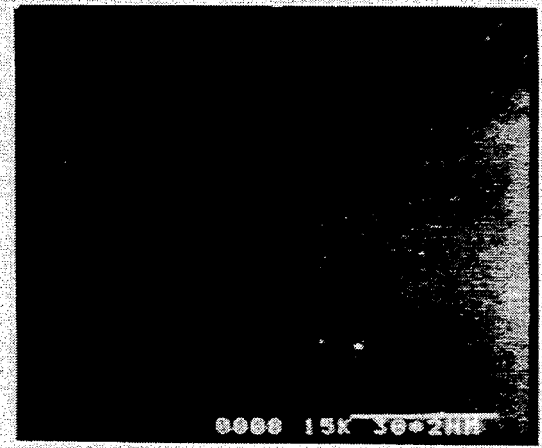
FIG. 3 is a photograph similar to FIG. 2, but showing a surface condition of a metal oxide film which is coated on glass plate by a conventional method.

Firstly, a clear float glass plate 300 mm square in widths and 5 mm in thickness was washed with neutral detergent, then with water and then with an alcohol. Separately, a first silicon ethoxide sol was prepared, such that polymer in the sol had an average molecular weight of about 5,700. A second silicon ethoxide sol was prepared, such that polymer in the sol had an average molecular weight of about 350,000. Then, 100 ml of the first silicon ethoxide sol and 50 ml of the second silicon ethoxide sol were mixed with 200 ml of isopropyl alcohol and 100 ml of 1-butanol in a beaker so as to make a coating solution. The coating solution was stirred for about 30 min, and its viscosity was adjusted to about 2 cP. The coating solution was applied to the glass plate by a dip coating. Then, the thus coated glass plate was heated at a temperature of about 200° C. for about 30 min, so as to form a gel film on the glass plate. With this, the gel film, i.e. a $SiO_2$ film as a first layer having a thickness of about 60 nm was formed. As shown in FIGS. 1 and 2, numerous micro-pits were observed on the first layer with using an atomic force microscope of SEIKO INSTRUMENTS INC. and a scanning electron microscope.

Then, a second layer was formed on the first layer in accordance with the following steps.

A titanium isopropyl alcohol sol was prepared, such that polymer in the sol had an average molecular weight of about 4,000. An isopropyltitanate sol was prepared, such that polymer in the sol had an average molecular weight of about 110,000. Then, 100 ml of the titanium isopropyl alcohol sol and 50 ml of the isopropyltitanate sol were mixed with 200 ml of isopropyl alcohol and 100 ml of ethanol in a beaker, so as to form a coating solution. This coating solution was stirred for about 30 min, and its viscosity was adjusted to about 2 cP. The coating solution was applied to the first $SiO_2$ film surface by the dip coating. The thus coated glass plate was heated at a temperature of about 200° C. for about 30 min. With this, a gel film, i.e. a $TiO_2$ film as a second layer having a thickness of about 70 nm was formed. Numerous micro-pits were also observed on the second layer with using the above-microscopes.

Then, a third layer was formed on the second layer in accordance with the following steps.

A silicon ethoxide sol was prepared, such that polymer in the sol had an average molecular weight of about 5,700. 100 ml of the silicon ethoxide sol was added to 200 ml of ethanol in a beaker, so as to produce a coating solution. This coating solution was stirred for about 30 min, and its viscosity was adjusted to about 2 cP. The coating solution was applied to the second layer by the dip coating. The thus coated glass plate was heated at a temperature of about 200° C. for about 30 min. With this, a gel film, i.e. a $SiO_2$ film as a third layer having a thickness of about 100 nm was formed. A smooth surface of the third layer having no micro-pits thereon was observed with using the above microscopes.

Viscosity of each of the above-mentioned coating solutions was adjusted to about 2 cP.

The thus formed glass plate having the three-layered films thereon was heated at a temperature of about 600° C. for about 40 min. Then, the adhesion strength test was conducted on the three-layered films by the cross-cut adhesion test according to JIS K 5400. The result indicated by the number of no peel areas among 100 areas tested with cellophane tape was 100/100. That is, none of 100 areas peeled off, which shows a good adhesion strength.

The average molecular weights of the above-mentioned polymers were determined, as reduced to polystyrene, with using a gas permeation chromatography machine called SHODEX which is a trade name of SHOWA DENKO Co.

EXAMPLE 2

In this example, five layered films were formed on a glass plate in accordance with the following steps.

The first ($SiO_2$) and second ($TiO_2$) layers were formed in the same manner as those of Example 1 were. Then, a third ($SiO_2$) layer was formed on the second layer in the same manner as the first layer of Example 1 was. Then, a fourth layer was formed in accordance with the following steps.

A first zirconium acetylacetonate sol was prepared, such that polymer in the sol had an average molecular weight of about 4,500. A second zirconium acetylacetonate sol was prepared, such that polymer in the sol had an average molecular weight of about 110,000. 100 ml of the first sol and 100 ml of the second sol were mixed with 100 ml of isobutanol and 200 ml of ethanol in a beaker so as to form a coating solution. This coating solution was stirred for about 30 min, and its viscosity was adjusted to about 2 cP. Then, the coating solution was applied to the third ($SiO_2$) layer by the dip coating. The thus coated glass plate was heated at a temperature of about 200° C. for 30 min. With this, a gel film as a fourth layer, i.e. a $ZrO_2$ film having a thickness of about 50 nm was formed. Then, a fifth layer was formed on the fourth layer in the same manner as the third layer of Example 1 was.

The surface condition of the fourth layer ($ZrO_2$ film) was observed with using the above microscopes. With this, the existence of numerous micro-pits were confirmed thereon.

The thus formed glass plate having the fifth-layered films thereon was heated at a temperature of about 600° C. for about 40 min. Then, the same adhesion strength test as that of Example 1 was conducted on the fifth-layered films. The result was 100/100.

Comparative Example 1

In this comparative example, three-layered films were formed on a glass plate in accordance with the following steps.

A silicon ethoxide sol was prepared, such that polymer in the sol had an average molecular weight of about 100,000. Then, 100 ml of the silicon ethoxide sol was mixed with 200 ml of ethanol and 100 ml of 1-butanol in a beaker, so as to form a coating solution. This coating solution was stirred for about 30 min, and its viscosity was adjusted to about 2 cP. Then, the coating solution was applied to the glass plate by the dip coating. The thus coated glass plate was heated at a temperature of about 200° C. for about 30 min. With this, a gel film of $SiO_2$ layer having a thickness of about 60 nm and a smooth surface was formed on the glass plate. Then, a second layer was formed on the first layer in accordance with the following steps.

An isopropyltitanate sol was prepared, such that polymer in the sol had an average molecular weight of about 4,000. Then, 100 ml of the isopropyltitanate sol was mixed with 200 ml of isopropyl alcohol and 100 ml of ethanol in a beaker, so as to make a coating solution. The coating solution was stirred for about 30 min, and adjusted to have a viscosity of about 2 cP. Then, the coating solution was applied to the first layer by the dip coating. The thus coated glass plate was heated at a temperature of about 200° C. for about 30 min. With this, a gel film as a second layer, i.e. a $TiO_2$ film having a thickness of about 70 nm was formed. Then, a third layer of $SiO_2$ film having a thickness of about 100 nm was formed on the second layer in the same manner as the first layer of this comparative example was. Then, the thus formed glass plate having the three-layered films thereon was heated at a temperature of about 600° C. for about 40 min. Then, the same adhesion strength test as that of Example 1 was conducted on the three-layered films. The result was 78/100. That is, all the three layers in 78 areas remained on the glass plate. In more detail, peeling occurred in 10 areas at an interface between the second and third layers, and in 12 areas at an interface between the first and second layers.

Comparative Example 2

In this comparative example, fifth-layered films were formed on a glass plate in accordance with the following steps.

First ($SiO_2$), second ($TiO_2$) and third ($SiO_2$) layers were formed on the glass plate in the same manner as the first, second and third layers of Comparative Example 1 were respectively. Then, a fourth layer was formed in accordance with the following steps.

A zirconium acetylacetonate sol was prepared, such that polymer in the sol had an average molecular weight of about 4,500. 100 ml of this sol was mixed with 200 ml of ethanol and 100 ml of butanol in a beaker so as to make a coating solution. This coating solution was stirred for about 30 min, and adjusted to have a viscosity of about 2 cP. Then, the coating solution was applied to the third layer by the dip coating. The thus coated glass plate was heated at a temperature of about 200° C. for about 30 min. With this, a gel film as a fourth layer, i.e. a $ZrO_2$ film of a thickness of about 50 nm was formed. Then, a fifth layer of $SiO_2$ film was formed on the fourth layer in the same manner as the third layer of Comparative Example 1 was. Then, the thus formed glass plate having the fifth-layered films thereon was heated at a temperature of about 600° C. for about 40 min. Then, the same adhesion strength test as that of Example 1 was conducted. The result was 83/100. That is, all the five layers in 83 areas remained on the glass plate. In more detail, peeling occurred in 10 areas at an interface between the fourth and fifth layers, and in 7 areas at an interface between the third and fourth layers.

What is claimed is:

1. A method of forming on a glass substrate a metal oxide film having numerous micro-pits formed on the metal oxide film, the method comprising the steps of:
   (a) preparing at least two sols respectively from at least one compound so as to disperse in said at least two sols at least two polymers of said at least one compound, said at least one compound being selected from the group consisting of metal alkoxides and metal acetylacetonates, said at least two polymers having different average molecular weights;
   (b) mixing said at least two sols together with a solvent to form one mixture;
   (c) applying the one mixture to the glass substrate so as to form a sol film on the glass substrate; and
   (d) heating the glass substrate and the sol film so as to transform the sol film into a gel film and to form numerous micro-pits on the gel film.

2. A method according to claim 1, wherein said solvent is an alcohol solution.

3. A method according to claim 1, wherein the glass substrate and the sol film are heated at step (d) at a temperature not lower than 100° C.

4. A method according to claim 1, wherein said at least one compound is selected from the group consisting of alkoxides of Si, Ti and Zr and acetylacetonates of Si, Ti and Zr.

5. A multi-layered film including at least one layer of a metal oxide film having numerous micro-pits, which is prepared in accordance with the method of claim 1.

6. A multi-layered film according to claim 5, wherein the numerous micro-pits are stable when the metal oxide film is baked at a temperature not lower than 500° C.

7. A method of forming on a glass substrate a metal oxide film having numerous micro-pits formed on the metal oxide film, the method comprising the steps of:
   (a) preparing at least two sols respectively from at least one compound so as to disperse in said at least two sols at least two polymers of said at least one compound, said at least one compound being selected from the group consisting of metal alkoxides and metal acetylacetonates, said at least two polymers having different average molecular weights;
   (b) mixing said at least two sols together with a solvent to form one mixture;
   (c) applying the one mixture to the glass substrate so as to form a sol film on the glass substrate; and
   (d) heating the glass substrate and the sol film so as to transform the sol film into a gel film and two form numerous micro-pits on the gel film;
   wherein one polymer of said at least two polymers has an average molecular weight ranging from about 800 to about 8000, other polymers of said at least two polymers having an average molecular weight not lower than 10,000.

8. A method according to claim 7, wherein the other polymers of said at least two polymers have an average molecular weight ranging from 10,000 to about 70,000.

9. A method according to claim 7, wherein the other polymers of said at least two polymers have an average molecular weight ranging from about 100,000 to about 400,000.

10. A method according to claim 7, wherein at step (b) said one polymer of said at least two polymers and the other polymers of said at least two polymers are mixed in a ratio of 1:1 to 8:1 by a number of moles of solutes on a metal oxide basis.

11. A method according to claim 10, wherein at step (b) said one polymer of said at least two polymers and the other polymers of said at least two polymers are mixed in a ratio of 3:1 to 6:1 by a number of moles of solutes on a metal oxide basis.

12. A method of forming on a glass substrate a metal oxide film having numerous micro-pits formed on the metal oxide film, the method comprising the steps of:
   (a) preparing at least two sols respectively from at least one compound so as to disperse in said at least two sols at least two polymers of said at least one compound, said at least one compound being selected from the group consisting of metal alkoxides and metal acetylacetonates, said at least two polymers having different average molecular weights;
   (b) mixing said at last two sols together with a solvent to form one mixture;
   (c) applying the one mixture to the glass substrate so as to form a sol film on the glass substrate; and
   (d) heating the glass substrate and the sol film so as to transform the sol film into a gel film and to form numerous micro-pits on the gel film,
   wherein at step (b) viscosity of the mixture is adjusted to 1–10 centipoises.

13. A metal oxide film coated on a glass substrate, the film having numerous micro-pits formed on the film, the film being prepared in accordance with a method comprising the steps of:
   (a) preparing at least two sols respectively from at least one compound so as to disperse in said at least two sols at least two polymers of said at least one compound, said at least one compound being selected from the group consisting of metal alkoxides and metal acetylacetonates, said at least two polymers having different average molecular weights;
   (b) mixing said at least two sols together with a solvent to form one mixture;
   (c) applying the one mixture to the glass substrate so as to form a sol film on the glass substrate; and
   (d) heating the glass substrate and the sol film so as to transform the sol film into a gel film and to form numerous micro-pits on the gel film.

14. A metal oxide film according to claim 13, wherein the numerous micro-pits are stable when the metal oxide film is baked at a temperature not lower than 500° C.

* * * * *